United States Patent
Covezzi et al.

(10) Patent No.: US 9,938,359 B2
(45) Date of Patent: Apr. 10, 2018

(54) PROCESS FOR THE PREPARATION OF ETHYLENE POLYMERS

(71) Applicant: Basell Poliolefine Italia S.r.l., Milan (IT)

(72) Inventors: Massimo Covezzi, Ferrara (IT); Gabriele Mei, Ferrara (IT); Pietro Baita, Ferrara (IT); Lorella Marturano, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 204 days.

(21) Appl. No.: 14/760,949

(22) PCT Filed: Dec. 18, 2013

(86) PCT No.: PCT/EP2013/077051
§ 371 (c)(1),
(2) Date: Jul. 14, 2015

(87) PCT Pub. No.: WO2014/108283
PCT Pub. Date: Jul. 17, 2014

(65) Prior Publication Data
US 2015/0376303 A1    Dec. 31, 2015

Related U.S. Application Data

(60) Provisional application No. 61/752,196, filed on Jan. 14, 2013.

(30) Foreign Application Priority Data

Jan. 14, 2013 (EP) .................................... 13151126

(51) Int. Cl.
| | | |
|---|---|---|
| *C08F 10/02* | (2006.01) | |
| *C08F 2/34* | (2006.01) | |
| *C08F 2/44* | (2006.01) | |
| *C08F 2/00* | (2006.01) | |
| *C08F 110/02* | (2006.01) | |

(52) U.S. Cl.
CPC .............. *C08F 10/02* (2013.01); *C08F 2/005* (2013.01); *C08F 2410/02* (2013.01)

(58) Field of Classification Search
CPC .... C08F 2/005; C08F 2/34; C08F 2/44; C08F 10/02; C08F 2410/02
USPC .......................................................... 526/74
See application file for complete search history.

(56) References Cited

U.S. PATENT DOCUMENTS

| | | |
|---|---|---|
| 5,410,002 A | 4/1995 | Govoni et al. |
| 2004/0242809 A1 | 12/2004 | Gallice et al. |
| 2012/0172549 A1 | 7/2012 | Mazzucco et al. |
| 2013/0197169 A1 | 8/2013 | Baita et al. |

FOREIGN PATENT DOCUMENTS

| | | |
|---|---|---|
| CN | 1041833 A | 5/1990 |
| EP | 056035 A1 | 7/1982 |
| RU | 2466144 C2 | 11/2012 |
| WO | WO-03033543 A1 | 4/2003 |
| WO | WO-2009010413 A1 | 1/2009 |
| WO | WO-2011029735 A1 | 3/2011 |
| WO | WO-2011080128 A1 | 7/2011 |
| WO | WO-2012041810 A1 | 4/2012 |

OTHER PUBLICATIONS

PCT International Search Report and Written Opinion dated Feb. 3, 2014 (Feb. 3, 2014) for Corresponding PCT/EP2013/077051.

*Primary Examiner* — Fred M Teskin

(57) ABSTRACT

A process for the preparation of ethylene polymers comprising polymerizing ethylene, optionally with one or more α-olefin comonomers, in the presence of:
(i) a solid catalyst component comprising titanium, magnesium, halogen and optionally an internal electron-donor compound,
(ii) an aluminum alkyl compound, and
(iii) an antistatic compound selected among the hydroxyesters with at least two free hydroxyl groups,
wherein the weight ratio of aluminum alkyl compound to solid catalyst component is higher than 0.80 and the weight ratio of antistatic compound to aluminum alkyl compound is higher than 0.10.

10 Claims, No Drawings

PROCESS FOR THE PREPARATION OF ETHYLENE POLYMERS

This application is the U.S. National Phase of PCT International Application PCT/EP2013/077051, filed Dec. 18, 2013, claiming benefit of priority to European Patent Application No. 13151126.3, filed Jan. 14, 2013, and benefit of priority under 35 U.S.C. § 119(e) of U.S. Provisional Application No. 61/752,196 filed Jan. 14, 2013, the contents of which are incorporated herein by reference in its entirety.

FIELD OF THE INVENTION

The present invention relates to a process for the preparation of ethylene-based polymers showing a significant reduction of fouling.

BACKGROUND OF THE INVENTION

In ethylene polymerization processes carried out in continuous, particularly in those carried out in gas phase, there is the need to face up to the formation of polymer agglomerates, such as polymer sheeting or chunks, in the polymerization reactor. Polymer agglomerates involve many negative effects: for example, they can disrupt the discharge of polymer from the reactor by plugging the polymer discharge valves. Furthermore, the agglomerates may also partially cover the fluidization grid of the reactor with a loss in the fluidization efficiency.

The presence of fine polymer particles in the polymerization medium favors the formation of polymer agglomerates (so-called fines). Those fines may be present as a result of introducing fine catalyst particles or as a result of the breakage of catalyst and/or polymer particles within the polymerization reactor. The fines are believed to deposit onto and electrostatically adhere to the inner walls of the polymerization reactor and on the equipment for recycling the gaseous stream such as, for example, the heat exchanger. If the fines remain active, then the particles will grow in size resulting in the formation of agglomerates, also caused by the partial melting of the polymer itself. Those agglomerates, when formed within the polymerization reactor, tend to be in the form of sheets or little chunks. Agglomerates can also partially plug the heat exchanger designed to remove the heat of polymerization reaction.

Several solutions have been proposed to solve the problem of formation of agglomerates during a gas-phase polymerization process. Such solutions include the deactivation of the fine polymer particles, the control of the catalyst activity and, above all, the reduction of the electrostatic charge by introducing antistatic agents inside the reactor.

EP 359444 describes the introduction into the polymerization reactor of small amounts of an activity retarder in order to keep substantially constant either the polymerization rate or the content of transition metal in the polymer produced. The process is said to produce a polymer without forming agglomerates.

U.S. Pat. No. 4,803,251 describes a process for reducing the polymer sheeting by utilizing a group of chemical additives, which generate both positive and negative charges in the reactor, and which are fed to the reactor in an amount of from about 0.1 to about 25 ppm based on the monomer feed, preferably ethylene, in order to prevent the formation of undesired positive or negative charges.

EP 560035 describes a polymerization process in which an anti-fouling compound is used to eliminate or reduce the build-up of polymer particles on the walls of a gas-phase polymerization reactor. This anti-fouling compound is preferably selected from alkydiethanolamines, which may be fed at any stage of the gas-phase polymerization process in an amount greater than 100 ppm by weight with respect to the produced (co)polymer. Said anti-fouling compound, when used in ethylene/propylene copolymerization, is capable to selectively inhibit the polymerization on polymer particles smaller than 850 μm that are responsible for fouling problems and polymer sheeting.

WO2003/033543 describes a process for the gas-phase (co) polymerization of olefins in a fluidized bed reactor wherein fouling is prevented and/or flowability of polymer is improved thanks to the use of a specific class of process aid additives.

WO2010/144080 describes catalyst systems for the polymerization of olefins containing a solid titanium catalyst component and an antistatic agent.

Despite the progresses made by the solutions proposed hitherto, it would still be desirable to further reduce the formation of so-called fines, particularly in gas-phase polymerization processes, without impairing the other features of the process.

SUMMARY OF THE INVENTION

It has now surprisingly been found that, in the presence of a specific class of antistatic agents, by judiciously lowering the relative amounts of catalyst components, it is possible to achieve a substantial reduction of the formation of polymer build-up on any equipment of the polymerization plant, including sheeting of reactor walls and deposit of polymer agglomerates onto the gas recycle line, without any significant change in mileage. Additionally, an improvement in polymer morphology has been observed.

Therefore, according to a first object the present invention provides a process for the preparation of ethylene polymers comprising polymerizing ethylene, optionally with one or more α-olefins of formula $CH_2=CHR$ wherein R is hydrogen or a hydrocarbon radical having from 1 to 12 carbon atoms, in the presence of:

(i) a solid catalyst component (cat) comprising titanium, magnesium, halogen and optionally an internal electron-donor compound (ID),
(ii) an aluminum alkyl compound (alk), and
(iii) an antistatic compound (AA) selected among the hydroxyesters with at least two free hydroxyl groups,
wherein the weight ratio of aluminum alkyl compound to solid catalyst component (alk/cat) is higher than 0.80 and the weight ratio of antistatic compound to aluminum alkyl compound (AA/alk) is higher than 0.10.

DETAILED DESCRIPTION OF THE INVENTION

The weight ratio alk/cat is preferably higher than 0.85, more preferably equal to or higher than 0.90. Suitably the weight ratio alk/cat is lower than 15, preferably lower than 12, more preferably lower than 10.

The weight ratio AA/alk is preferably equal to or higher than 0.11, more preferably equal to or higher than 0.12. Suitably the weight ratio alk/cat is lower than 1.0, preferably lower than 0.5, more preferably lower than 0.3.

The weight ratio AA/cat is generally comprised between 0.05 and 0.5, preferably between 0.10 and 0.20.

Preferred hydroxyesters with at least two free hydroxyl groups that can be used as antistatic compounds in the process of the present invention are those obtained from carboxylic acids with from 8 to 22 carbon atoms and from polyalcohols. Particularly preferred are the glycerol mono-stearate and the glycerol mono-palmitate, the glycerol mono-stearate (GMS90) being the most preferred.

Other antistatic or anti-fouling agents can be used in the process of the invention in combination with the above-described hydroxyesters. An antistatic or anti-fouling agent is any substance that is capable to prevent, eliminate or substantially reduce the formation of build-up of polymer on any equipment of the polymerization plant, including sheeting of reactor walls, or deposits of polymer agglomerates onto any line of the polymerization plant, including the gas recycle line. They include the following compounds:

(a) antistatic substances capable of neutralizing the electrostatic charges of the polymer particles;
(b) catalyst deactivators that partially deactivate the aluminium alkyl co-catalyst, provided that they do not substantially inhibit the overall polymerization activity.

In general, all the antistatic or anti-fouling agents conventionally known in the art, which are able to prevent, eliminate or substantially reduce the formation of build-up of polymer on any part of the polymerization plant, may be used. The antistatic or anti-fouling agent can be selected from one or more of the following classes:

(1) alkyldiethanolammines of formula R—N(CH$_2$CH$_2$OH)$_2$ wherein R is an alkyl radical comprised between 10 and 20 carbon atoms, preferably between 12 and 18 carbon atoms;
(2) polyepoxidate oils, such as epoxidate linseed oil and epoxidate soya oil;
(3) polyalcohols having from 4 to 8 carbon atoms;
(4) amides of formula R—CONR'R", wherein R, R', and R" may be the same or different and is a saturated or unsaturated hydrocarbon radical having 1 to 22 carbon atoms;
(5) fatty acid soaps represented by the general formula R—COOM, wherein R is a saturated or unsaturated hydrocarbon radical having 12 to 22 carbon atoms, and M is an alkali or alkaline earth metal;
(6) salts of sulfuric acid esters of higher alcohols represented by the general formula ROS0$_3$M, wherein R is a saturated or unsaturated hydrocarbon radical having 12 to 22 carbon atoms, and M is an alkali or alkaline earth metal;
(7) salts of sulfuric acid esters of higher secondary alcohols represented by the general formula:

wherein R and R' may be the same or different and are selected from saturated or unsaturated hydrocarbon radical having 12 to 22 carbon atoms, M is an alkali or alkaline earth metal;
(8) compounds represented by the general formula:

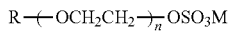

wherein R is selected from saturated or unsaturated hydrocarbon radical having 12 to 22 carbon atoms, M is an alkali or alkaline earth metal, and n is from 1-10;
(9) salts of (higher alkyl) sulfonic acids represented by the general formula RSO$_3$M wherein R is selected from saturated or unsaturated hydrocarbon radical having 12 to 22 carbon atoms, M is an alkali or alkaline earth metal, and n is from 1-10;
(10) salts of alkylarylsulfonic acids;
(11) alkali or alkaline earth metal salts of dialkylsulfosuccinic acids;
(12) alkali or alkaline earth metal salts of partial esters of higher alcohols with phosphoric acid;
(13) salts of primary amines represented by the general formula

wherein R is a saturated or unsaturated hydrocarbon radical; A is chlorine, bromine;
(14) compounds of the alkylaminesulfonic acid type represented by the general formula

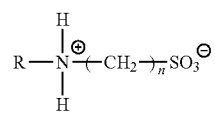

(15) compounds represented by the general formula

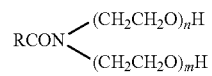

wherein R is a saturated or unsaturated hydrocarbon radical having 4 to 22 carbon atoms; and n and m, which may be the same or different, are from 1-10.

An overview of antistatic agents suitable for use in the polymerization process of the invention is also given in EP 107127.

Preferred anti-fouling agents for use as additional antistatic agents in the process of the invention are the compounds belonging to the above classes (1), (2), (3) and (4).

Preferred compounds among those of class (1) are the alkydiethanolamines wherein the alkyl group has from 10 to 18 carbon atoms. Particularly preferred is a product commercialized under the trademark Atmer 163® (a mixture of alkyldiethanolammines of formula R—N(CH$_2$CH$_2$OH)$_2$ where R is an alkyl radical C$_{12}$-C$_{18}$).

Preferred compounds among those of class (2) are products commercialized under the trademark Edenol D82® and Edenol B316®. According to a preferred embodiment, in the solid catalyst components the amount of internal electron-donor compound (ID) selected from glycols, esters, ketones, amines, amides, nitriles, alkoxysilanes and ethers, is less than 10% by weight, preferably less than 5% by weight, more preferably said internal electron-donor compound (ID) is substantially absent. In that case, the weight ratio of aluminum alkyl compound to solid catalyst component is suitably lower that 2.5, preferably comprised between 2.0 and 0.5, more preferably between 1.5 and 0.6, even more preferably between 1.2 and 0.8.

According to an embodiment of the present invention, the solid catalyst component (i) comprises a Ti compound and a magnesium dihalide. Preferred titanium compounds are the tetrahalides or the compounds of formula TiX$_n$(OR$^1$)$_{4-n}$, where n is comprised between 0 and 3, X is halogen, preferably chlorine, and R$^1$ is a C$_1$-C$_{10}$ hydrocarbon group. Titanium tetrachloride is the preferred compound.

The magnesium dihalide is preferably MgCl$_2$ in active form which is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the ASTM-card reference of the spectrum of the non-active halide is diminished in intensity and broadened. In the X-ray spectra of preferred magnesium dihalides in active form said most intense line is diminished in intensity and replaced by a halo whose maximum intensity is displaced towards lower angles relative to that of the most intense line.

The internal electron-donor compound (ID), when present, can be selected from glycols, esters, ketones, amines, amides, nitriles, alkoxysilanes and ethers. Preferred electron donors are those selected from esters, ethers and ketones. Among them, particularly preferred are those selected from aliphatic ethers particularly the $C_2$-$C_{20}$ aliphatic ethers and in particular the cyclic ethers preferably having 3-5 carbon atoms such as tetrahydrofurane (THF) or dioxane.

Preferred esters are the alkyl esters of $C_1$-$C_{20}$ aliphatic carboxylic acids and in particular $C_1$-$C_8$ alkyl esters of aliphatic mono carboxylic acids such as ethylacetate, methyl formiate, ethylformiate, methylacetate, propylacetate, i-propylacetate, n-butylacetate, i-butylacetate.

Preferred ketones are those of formula R"COR" in which the R" groups are, independently, a $C_2$-$C_{20}$ hydrocarbon group. Particularly preferred are the ketones in which at least one of R" is a $C_1$-$C_{10}$ alkyl group The ratios among Ti, Mg and an optional internal electron-donor compound (ID) may vary among broad ranges but it constitutes a preferred aspect of the present invention the use of catalyst components in which the Mg/Ti molar ratio is higher than 4 and the ID/Ti molar ratio is higher than 2. Still more preferably, the Mg/Ti molar ratio is higher than 5 and the ID/Ti molar ratio is higher than 3.

The catalyst components of the invention can be prepared according to several methods.

According to one of them, the magnesium dichloride in an anhydrous state and the suitable amount of ID are milled together under conditions in which activation of the magnesium dichloride occurs. The so obtained product can be treated one or more times with a suitable amount of $TiCl_4$. This treatment is followed by washings with hydrocarbon solvents until chloride ions disappeared In an alternative method, which is preferred, the titanium compound and the Mg compound, preferably Mg dihalide, are first contacted optionally in the presence of an inert medium, in order to prepare an intermediate product, containing a titanium compound supported on Mg dihalide, that, if desired can also be isolated. Subsequently, the ID compound is then contacted with this intermediate product in order to prepare the final catalyst component.

A precursor of Mg dihalide can be used as starting Mg compound. Suitable precursors are the Lewis adducts between Mg dihalides and suitable Lewis bases. A particular and preferred class being constituted by the $MgX_2 \cdot (R"OH)_m$ adducts in which R" groups are $C_1$-$C_{20}$ hydrocarbon groups, preferably $C_1$-$C_{10}$ alkyl groups, X is halogen preferably chlorine and m is from 0.1 to 6, preferably from 0.5 to 3 and more preferably from 0.5 to 2. Adducts of this type can generally be obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Representative methods for the preparation of these spherical adducts are reported for example in U.S. Pat. No. 4,469,648, U.S. Pat. No. 4,399,054, and WO98/44009. Another useable method for the spherulization is the spray cooling described for example in U.S. Pat. Nos. 5,100,849 and 4,829,034.

Particularly interesting are the $MgCl_2 \cdot (EtOH)_m$ adducts in which m is from 0.15 to 1.7 obtained subjecting the adducts with a higher alcohol content to a thermal dealcoholation process carried out in nitrogen flow at temperatures comprised between 50 and 150° C. until the alcohol content is reduced to the above value. A process of this type is described in EP 395083.

The $MgX_2 \cdot (R"OH)_m$ adducts are generally converted into the corresponding halides through the reaction with dealcoholating compounds. In one of the particular embodiments of the present invention it is preferred that the dealcoholation reaction is carried out simultaneously with the step of reaction involving the use of a titanium compound. Accordingly, these adducts are reacted with the $TiX_n(OR^1)_{4-n}$ compound (or possibly mixtures thereof) mentioned above which is preferably titanium tetrachloride. The reaction with the Ti compound can be carried out by suspending the adduct in $TiCl_4$ (generally cold) the mixture is heated up to temperatures ranging from 80-130° C. and kept at this temperature for 0.5-2 hours. The treatment with the titanium compound can be carried out one or more times. Preferably, it is repeated twice. It can also be carried out in the presence of an electron donor compound as those mentioned above. At the end of the process the solid is recovered by separation of the suspension via the conventional methods (such as settling and removing of the liquid, filtration, centrifugation) and can be subject to washings with solvents. Although the washings are typically carried out with inert hydrocarbon liquids, it is also possible to use more polar solvents (having for example a higher dielectric constant) such as halogenated hydrocarbons.

The so obtained solid intermediate can also undergo a post-treatment with particular compounds suitable to impart to it specific properties. As an example, it can be subject to a treatment with a reducing compound for example an Al-alkyl compound, in order to lower the oxidation state of the titanium compound contained in the solid.

As mentioned above, the intermediate product can then be brought into contact with the ED compound under conditions able to fix on the solid an effective amount of donor. Due to the high versatility of this method, the amount of donor used can widely vary. As an example, it can be used in molar ratios with respect to the Ti content in the intermediate product ranging from 0.5 to 20 and preferably from 1 to 10. Although not strictly required the contact is typically carried out in a liquid medium such as a liquid hydrocarbon. The temperature at which the contact takes place can vary depending on the nature of the reagents. Generally, it is comprised in the range from −10° C. to 150° C. and preferably from 0° C. to 120° C. It is plane that temperatures causing the decomposition or degradation of any specific reagent should be avoided even if they fall within the generally suitable range. Also the time of the treatment can vary in dependence of other conditions such as nature of the reagents, temperature, concentration etc. As a general indication this contact step can last from 10 minutes to 10 hours more frequently from 0.5 to 5 hours. If desired, in order to further increase the final donor content, this step can be repeated one or more times. At the end of this step the solid is recovered by separation of the suspension via the conventional methods (such as settling and removing of the liquid, filtration, centrifugation) and can be subject to washings with solvents. Although the washings are typically carried out with inert hydrocarbon liquids, it is also possible to use more polar solvents (having for example a higher dielectric constant) such as halogenated or oxygenated hydrocarbons.

Also in this case the so obtained solid can undergo a post-treatment with particular compounds suitable to impart to it specific properties. As an example it can be subject to a treatment with a reducing compound for example an Al-alkyl compound, in order to lower the oxidation state of the titanium compound contained in the solid.

The aluminum alkyl compound (ii) used in the process of the present invention can be selected from the trialkyl aluminum compounds such as for example trimethylaluminum (TMA), triethylaluminum (TEAL), triisobutylaluminum (TIBA), tri-n-butylaluminum, tri n-hexylaluminum, tri-n-octylaluminum. Also alkylaluminum halides and in particular alkylaluminum chlorides such as diethylaluminum chloride (DEAC), diisobutylalumunum chloride, Al-sesquichloride and dimethylaluminum chloride (DMAC) can be used. It is also possible to use, and in certain cases preferred, mixtures of trialkylaluminum's with alkylaluminum halides. Among them mixtures TEAL/DEAC and TIBA/DEAC are particularly preferred.

The above mentioned components (i), and (ii) can be fed separately into the reactor where, under the polymerization conditions can exploit their activity. It constitutes however a particular advantageous embodiment the pre-contact of the above components, optionally in the presence of small amounts of olefins, for a period of time generally ranging from 0.1 to 300 minutes. The pre-contact can be carried out in a liquid diluent at a temperature ranging from 0 to 90° C. preferably in the range of 20 to 70° C.

In addition it could be also possible to introduce the Al-alkyl compound(s) (ii) into the polymerization reactors in two or more aliquots. As an example, a first aliquot can be used to form the catalysts system in the precontact section together with the component (i) and then introduced into the reactor for the polymerization step (a) and a second aliquot can be added to the system in the further step (b).

The above described catalyst system can be used directly in the main polymerization process or alternatively, it can be pre-polymerized beforehand. A pre-polymerization step is usually preferred when the main polymerization process is carried out in the gas phase. The pre-polymerization can be carried out with any of the olefins $CH_2=CHR$, where R is H or a $C_1-C_{10}$ hydrocarbon group. In particular, it is especially preferred to pre-polymerize ethylene or mixtures thereof with one or more α-olefins, said mixtures containing up to 20% in moles of α-olefin, forming amounts of polymer from about 0.1 g per gram of solid component up to about 1000 g per gram of solid catalyst component. The pre-polymerization step can be carried out at temperatures of from 0 to 80° C., in the liquid or gas phase. The pre-polymerization step can be performed in-line as a part of a continuous polymerization process or separately in a batch process.

The process of the present invention can be carried out with different polymerization techniques. The polymerization process can be carried out in one or more reactors operated in solution, slurry or gas-phase in accordance with what is generally known in the art. The polymerization process carried out in gas-phase is the preferred one. Accordingly, the following detailed information about polymerization conditions are referred particularly to the gas-phase polymerization. However, it is within the skills of the skilled in the art to apply the same principles and determine the most suitable conditions when the polymerization is carried out according to the other mentioned polymerization techniques. The gas-phase reactor in which the process is carried out can be fluidized bed reactors or mechanically stirred bed reactors both of which are very well known in the art. In addition, the process can also be carried out in two serially interconnected gas-phase reactors. These reactors are described in EP 782587 and EP 1012195 and are characterized by two interconnected polymerization zones, in which the polymer particles flow under different fluidization conditions and reactants composition.

It is also possible to combine multiple gas-phase reactors in cascade. For example a fluidized bed gas-phase reactor can be associated to a gas-phase reactor having two interconnected polymerization zones, or a first fluidized bed gas-phase reactor can be can be associated to a second fluidized bed gas-phase reactor.

Hydrogen is suitably used as molecular weight regulator.

The remaining portion of the feeding mixture is represented by inert gases and one or more $C_3-C_{12}$ α-olefin comonomer if any. Inert gases which are necessary to dissipate the heat generated by the polymerization reaction are conveniently selected from nitrogen or saturated hydrocarbons, the most preferred being propane.

The operating temperature in the polymerization reactor(s) is selected between 50 and 120° C., preferably between 60 and 100° C., while the operating pressure is between 0.5 and 10 MPa, preferably between 2.0 and 3.5 MPa.

As mentioned above, in this polymerization step an amount of (ED) donor can be added as a fresh reactant in order to obtain a final polymer having good quality. The ED compound can be equal to, or different from, the ED compound described above and can be selected among alcohol, glycols, esters, ketones, amines, amides, nitriles, alkoxysilanes and ethers. The electron donor compounds (ED) can be used alone or in mixture with each other. Preferably the ED compound is selected among aliphatic ethers, esters and alkoxysilanes. Preferred ethers are the $C_2-C_{20}$ aliphatic ethers and in particular the cyclic ethers preferably having 3-5 carbon atoms such as tetrahydrofurane (THF), dioxane.

Preferred esters are the alkyl esters of $C_1-C_{20}$ aliphatic carboxylic acids and in particular $C_1-C_8$ alkyl esters of aliphatic mono carboxylic acids such as ethylacetate, methyl formiate, ethylformiate, methylacetate, propylacetate, i-propylacetate, n-butylacetate, i-butylacetate.

Preferred alkoxysilanes are those of formula $R_a^5R_b^6Si(OR^7)_c$, where a and b are integer from 0 to 2, c is an integer from 1 to 4 and the sum (a+b+c) is 4; $R^5$, $R^6$, and $R^7$, are alkyl, cycloalkyl or aryl radicals with 1-18 carbon atoms optionally containing heteroatoms. Particularly preferred are the silicon compounds in which a is 0 or 1, c is 2 or 3, $R^6$ is an alkyl or cycloalkyl group, optionally containing heteroatoms, and $R^7$ is methyl. Examples of such preferred silicon compounds are methyltrimethoxysilane, dimethyldimethoxysilane, trimethylmethoxysilane and t-butyltrimethoxysilane.

Preferred ketones are those of formula R"COR" in which the R" groups are, independently, a $C_2-C_{20}$ hydrocarbon group. Particularly preferred are the ketones in which at least one of R" is a $C_1-C_{10}$ alkyl group.

Preferred alcohol are those of formula $R^3OH$ in which the $R^3$ group is a $C_1-C_{20}$ hydrocarbon group. Preferably, $R^3$ is a $C_1-C_{10}$ alkyl group. Specific examples are methanol, ethanol, isopropanol and butanol.

Preferred amines are those of formula $NR^4_3$ in which the $R^4$ groups, are, independently, hydrogen or a $C_1-C_{20}$ hydrocarbon group with the proviso that they are not contemporaneously hydrogen. Preferably, $R^4$ is a $C_1-C_{10}$ alkyl group. Specific examples are dietilamine, diisopropylamine and triethylamine Preferred amides are those of formula $R^5CONR^6_2$ in which $R^5$ and $R^6$ are, independently, hydrogen or a $C_1-C_{20}$ hydrocarbon group. Specific examples are formamide and acetamide. Preferred nitriles are those of formula $R^3CN$ where $R^3$ has the same meaning given above. A specific example is acetonitrile.

Preferred glycol are those having a total number of carbon atoms lower than 50. Among them particularly preferred are the 1,2 or 1,3 glycol having a total number of carbon atoms lower than 25. Specific examples are ethylenglycol, 1,2-propylenglycol and 1,3-propylenglycol.

The use of tetrahydrofurane is especially preferred.

When used, the ED donor is used in amounts that give total Al/donor molar ratios ranging from 1 to 100, preferably from 5 to 60.

Suitable methods for feeding the antistatic compound to the polymerization reactor are described in the International Applications PCT/EP2011/066679 and PCT/EP2011/066680 (yet unpublished).

Ethylene polymers that can be obtained with the process of the present invention are primarily high density polyethylene (HDPE), but also linear low density polyethylene (LLDPE).

Further advantages and characteristics of the present invention will appear clear from the following examples, which are provided for illustrative purposes only and are not intended to limit the scope of the invention.

EXAMPLES

Characterization

The properties given in the examples were measured according to the following methods:
Melt index E (MIE): ASTM-D 1238, condition 190° C./2.16 kg.
Density: ASTM-D 792.
Bulk density: DIN-53194
Particle size distribution (PSD): Determined by using a Tyler Testing Sieve Shaker RX-29 Model B available from Combustion Engineering Endecott provided with a set of six sieves, according to ASTM E-11-87, of number 5, 7, 10, 18, 35, and 200 respectively.

Examples 1 and 4 (Comparative) and 2-3 (Inventive)

Preparation of Solid Catalytic Component

The solid catalytic component is a Ziegler-Natta catalyst powder comprising a titanium tetrachloride compound supported on a magnesium chloride, and prepared with the procedure described in Example 2 of WO2010/076289.

The solid catalytic component has a Ti content of 4.9% by weight, a particle average size of 72 µm and a particle size distribution between 57 and 87 µm.

Preparation of Catalyst Suspension

A dispersion tank with an internal diameter of 14.5 cm is used. This tank is equipped with a stirrer, an external water jacket for the temperature regulation, a thermometer and a cryostat. The following components are used to prepare the catalyst suspension:

the above indicated Ziegler Natta catalyst powder;
white oil OB22 AT having a dynamic viscosity of 30 cPs at 20° C.;
microbeads of glycerol monostearate (GMS90, melting point 68° C.) with an average diameter of 336 µm and a particle size distribution of between 150 and 600 µm.

1005 g of white oil OB22 are fed into the dispersion tank at room temperature (25° C.). Successively, 300 g of catalyst powder and 40 g of microbeads of GSM90 are loaded to the tank containing the oil, while continuously maintaining under stirring the dispersion tank.

Once completed the feed of catalyst and GMS90, the obtained suspension is maintained under stirring conditions for 30 minutes adjusting the temperature of the dispersion tank at 13° C. The velocity of the stirring device is adjusted to 85 rpm during the mixing of the components of the suspension.

The obtained suspension has a catalyst concentration of about 252 g/l (grams of catalyst for liter of oil). The catalyst suspension contains the antistatic compound in a weight ratio GMS90/catalyst of 0.13.

Preparation of Catalyst Paste 431 g of molten vaseline grease BF (thickening agent) are fed to the dispersion tank containing the catalyst suspension at a feed temperature of 80° C. The molten thickening agent is slowly fed for a time of 3 minutes, while stirring the catalyst suspension in the dispersion tank with a velocity of 85 rpm. The catalyst suspension is maintained at a temperature of 13° C. during the addition of the molten vaseline grease: as a consequence, the molten thickening agent solidifies almost instantaneously on contact with the catalyst suspension. After the feed of the molten vaseline, the components of the catalytic paste are always maintained under stirring at 85 rpm for a time of 90 minutes. During this time the temperature is kept at 13° C. in the dispersion tank.

The obtained catalytic paste has a weight ratio grease/oil of about 0.43, while the concentration of the solid (catalyst+antistatic) in the catalytic paste is equal to about 170 g/l.

Catalyst Activation

The obtained catalytic paste is withdrawn by the dispersion tank by a dosing syringe and is then continuously transferred by means of two dosing syringes to a catalyst activation vessel.

Triisobutyl-aluminium (TIBAL) is used as the cocatalyst with a weight ratio TIBAL/catalyst of 2.0. No external donor is used and propane is fed as a diluent to the activation vessel. The above components are pre-contacted in the activation vessel at a temperature of 20° C. for the time indicated in Table 1.

The activated catalytic paste is discharged from the activation vessel and is continuously fed to a gas-phase fluidized bed reactor for the polymerization of olefins.

Polymerization

The activated catalytic paste is introduced into the fluidized bed reactor, where ethylene is polymerized to produce high density polyethylene (HDPE). The polymerization is operated in the presence of propane as a polymerization diluent and hydrogen as the molecular weight regulator. The polymerization conditions and the composition of the gaseous reaction mixture are indicated in Table 1.

Under these operative conditions of high temperature and pressure, the components of the catalytic paste separate each other, so that both the catalyst particles and the antistatic compound are freely released in the polymerization medium to carry out their respective functions. GSM90 is subjected to a quick melting, so that it becomes a finely divided liquid (droplets) sprayed on the monomers and polymer particles in the polymerization medium, thus performing its function of neutralizing the electrostatic charges.

The characterization of the HDPE discharged from the reactor is reported in Table 1.

By comparing the data on particle size, it results that in the examples 2, 3 and 4 (comp.) the amounts of so-called fines were substantially reduced. This brought about a significant reduction of fouling inside the fluidized bed reactor and in the equipment arranged along the gas recycle line (compressor and heat exchanger). It is also notable that the reduction of the alk/cat weight ratio up to a certain extent does not result in mileage depression. On the contrary and quite surprisingly, in examples 2 and 3 with the alk/cat weight ratio of 1.0 and 0.9 the obtained mileage is higher than that of comparative example 1. However, by further lowering the alk/cat weight ratio a drop in mileage is observed—see comparative example 4.

TABLE 1

|  |  |  | Example | | | |
| --- | --- | --- | --- | --- | --- | --- |
|  |  |  | 1 (comp.) | 2 | 3 | 4 (comp.) |
| Catalyst prep. | T | ° C. | 20 | 20 | 20 | 20 |
|  | time | min | 79 | 82 | 83 | 83 |
|  | Alk/cat | g/g | 2.0 | 1.0 | 0.9 | 0.8 |
| Polymeriz. | T | ° C. | 75 | 75 | 75 | 75 |
|  | P | bar | 24 | 24 | 23 | 23 |
|  | AA/alk | g/g | 0.07 | 0.13 | 0.14 | 0.17 |
|  | AA/pol | ppm wt | 39.2 | 35.0 | 37.0 | 40.0 |
|  | $C_2^-$ | % | 7.9 | 9.1 | 9.8 | 9.2 |
|  | $H_2/C_2^-$ |  | 3.90 | 3.80 | 3.60 | 3.80 |
|  | Mileage | g/g | 3421 | 3697 | 3587 | 3313 |
|  | Spec. Mil. | g/g · bar · h | 721 | 727 | 626 | 588 |
|  | time | h | 2.4 | 2.2 | 2.4 | 2.5 |
| Polymer charact. | MIE | g/10' | 145 | 141 | 130 | 137 |
|  | density | g/cc | 0.9668 | 0.9679 | 0.9687 | 0.9672 |
|  | Bulk density | g/cc | 0.459 | 0.489 | 0.487 | 0.491 |
|  | P50 | micron | 894.1 | 915.3 | 915.4 | 900.2 |
|  | <106 | % | 0.2 | 0.0 | 0.0 | 0.0 |
|  | <125 | % | 0.3 | 0.0 | 0.0 | 0.1 |
|  | <180 | % | 0.6 | 0.2 | 0.1 | 0.2 |
|  | <300 | % | 1.8 | 0.8 | 0.8 | 0.7 |
|  | <500 | % | 7.5 | 5.7 | 4.9 | 5.0 |

What is claimed is:

1. A process for the preparation of ethylene polymers comprising polymerizing ethylene, optionally with one or more α-olefins of the general formula CH$_2$=CHR, wherein R is hydrogen or a hydrocarbon radical having from 1-12 carbon atoms, in the presence of:
   (i) a solid catalyst component (cat) comprising titanium, magnesium, halogen and optionally an internal electron-donor compound (ID),
   (ii) an aluminum alkyl compound (alk), and
   (iii) an antistatic compound (AA) selected among the hydroxyesters with at least two free hydroxyl groups, wherein the weight ratio of aluminum alkyl compound to solid catalyst component (alk/cat) is 0.80-15, the weight ratio of antistatic compound to aluminum alkyl compound (AA/alk) is 0.10-1 and the weight ratio of antistatic compound to catalyst (AA/cat) is 0.05-0.5.

2. The process of claim 1, wherein the antistatic compound (AA) is glycerol mono-stearate or glycerol mono-palmitate.

3. The process of claim 1, which is carried out in the presence of a mixture of alkyldiethanolamines of formula R—N(CH$_2$CH$_2$OH)$_2$ where R is an alkyl radical comprising a C$_{12}$-C$_{18}$ as another antistatic compound.

4. The process of claim 1, which is carried out in gas-phase.

5. The process of claim 1, which is carried out in multiple gas-phase reactors in cascade.

6. The process of claim 5, wherein a fluidized bed gas-phase reactor is associated to a gas-phase reactor having two interconnected polymerization zones, or a first fluidized bed gas-phase reactor is associated to a second fluidized bed gas-phase reactor.

7. The process of claim 1, wherein the weight ratio of aluminum alkyl compound to solid catalyst component (alk/cat) is 0.80-12.

8. The process of claim 1, wherein the weight ratio of antistatic compound to catalyst (AA/cat) is 0.10-0.2.

9. The process of claim 1, comprising an internal electron-donor compound (ID) at a concentration of less than 10% by weight.

10. The process of claim 1, comprising an internal electron-donor compound (ID) at a concentration of less than 5% by weight.

* * * * *

UNITED STATES PATENT AND TRADEMARK OFFICE
CERTIFICATE OF CORRECTION

Page 1 of 1

PATENT NO. : 9,938,359 B2
APPLICATION NO. : 14/760949
DATED : April 10, 2018
INVENTOR(S) : Covezzi et al.

It is certified that error appears in the above-identified patent and that said Letters Patent is hereby corrected as shown below:

In the Specification

In Column 4, Line 40, delete "alkyldiethanolammines" and insert -- alkydiethanolamines --.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*